United States Patent
Takatsuki

(10) Patent No.: US 10,237,635 B2
(45) Date of Patent: Mar. 19, 2019

(54) ELECTRONIC DEVICE INCLUDING ELEMENT IN WHICH ELECTRIC CURRENT FLOWS, AND IMAGE FORMING DEVICE INCLUDING THE ELECTRONIC DEVICE

(71) Applicant: KYOCERA Document Solutions Inc., Osaka (JP)

(72) Inventor: Yasushi Takatsuki, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 24 days.

(21) Appl. No.: 15/656,581

(22) Filed: Jul. 21, 2017

(65) Prior Publication Data

US 2018/0027315 A1  Jan. 25, 2018

(30) Foreign Application Priority Data

Jul. 25, 2016 (JP) .................................. 2016-145681
Oct. 28, 2016 (JP) .................................. 2016-211830

(51) Int. Cl.
| | |
|---|---|
| H04R 1/02 | (2006.01) |
| H01B 7/29 | (2006.01) |
| C09K 21/06 | (2006.01) |
| G03G 21/00 | (2006.01) |
| H04R 9/06 | (2006.01) |

(52) U.S. Cl.
CPC ............. *H04R 1/025* (2013.01); *C09K 21/06* (2013.01); *G03G 21/00* (2013.01); *H01B 7/29* (2013.01); *H04R 1/028* (2013.01); *H04R 9/06* (2013.01)

(58) Field of Classification Search
None
See application file for complete search history.

(56) References Cited

U.S. PATENT DOCUMENTS

2011/0144244 A1  6/2011  Lee

FOREIGN PATENT DOCUMENTS

| EP | 1001435 A2 | 5/2000 |
|---|---|---|
| EP | 1365421 A1 | 11/2003 |
| JP | 2006-176659 A | 7/2006 |
| JP | 2009-093837 A | 4/2009 |
| JP | 2015-170389 A | 9/2015 |
| WO | 2015-080005 A | 6/2015 |
| WO | 2016-030865 A1 | 3/2016 |

OTHER PUBLICATIONS

English machine translation of JP2009093837A.*
Extended European Search Report dated Dec. 5, 2017 mailed in the corresponding European Patent Application No. 171826241.
Database WPI Week 201565 Sep. 28, 2015(Sep. 28, 2015) Thomson Scientific, London, GB; AN 2015-583190 XP002775947, & JP 2015 170389 A (Hitachi Metals LTD) Sep. 28, 2015(Sep. 28, 2015) Abstract; example comp 7*.

* cited by examiner

*Primary Examiner* — David M Gray
*Assistant Examiner* — Geoffrey T Evans
(74) *Attorney, Agent, or Firm* — IP Business Solutions, LLC

(57) ABSTRACT

An electronic device includes an element, a first member, and a second member. An electric current flows in the element. The element is mounted in the first member or the first member is arranged to face the element. In addition, the first member is made of a first resin. The second member is provided adjacent to the first member. In addition, the second member is made of a second resin. In addition, one of the first resin and the second resin has lower non-flammability than the other.

19 Claims, 9 Drawing Sheets

| CRITERIA OF FLAMMABILITY OF OXYGEN INDEX | |
|---|---|
| OXYGEN INDEX | BURNS OR DOES NOT BURN |
| 22 OR LESS | FLAMMABLE, BURNS |
| 22 TO 27 | BURNS, BUT SELF-EXTINGUISHING |
| 27 OR MORE | NON-FLAMMABLE |

Fig.2

CRITERIA OF FLAMMABILITY OF OXYGEN INDEX

| OXYGEN INDEX | BURNS OR DOES NOT BURN |
|---|---|
| 22 OR LESS | FLAMMABLE, BURNS |
| 22 TO 27 | BURNS, BUT SELF-EXTINGUISHING |
| 27 OR MORE | NON-FLAMMABLE |

Fig.3A

CRITERIA OF GRADE ACCORDING TO UL94 STANDARD
(HORIZONTAL BURNING TEST)

| UL94 | CRITERIA |
|---|---|
| HB | IT IS NOT SELF-EXTINGUISHING BUT EXHIBITS A FLAME RETARDANT PROPERTY. THE BURNING RATE SHOULD BE 40 mm/min OR LESS IN A TEST PIECE WITH A THICKNESS OF 3 mm OR MORE. |

Fig.3B

CRITERIA OF GRADE ACCORDING TO UL94 STANDARD
(VERTICAL BURNING TEST)

| UL94 | CRITERIA |
|---|---|
| 5VA | THIS IS THE HIGHEST NON-FLAMMABILITY. THE BURNING TIME IS 60 SECONDS OR LESS AFTER THE FIFTH APPLICATION OF FLAME |
| 5VB | THIS IS THE HIGHEST NON-FLAMMABILITY. THE BURNING TIME IS 60 SECONDS OR LESS AFTER THE FIFTH APPLICATION OF FLAME |
| V-0 | THE BURNING TIME IS 10 SECONDS OR LESS EVEN IF FLAME IS APPLIED TWICE (EACH FOR 10 SECONDS) |
| V-1 | THE BURNING TIME IS 30 SECONDS OR LESS EVEN IF FLAME IS APPLIED TWICE (EACH FOR 10 SECONDS) |
| V-2 | THE BURNING TIME IS 30 SECONDS OR LESS EVEN IF FLAME IS APPLIED TWICE (EACH FOR 10 SECONDS) |

Fig.4

NON-FLAMMABILITY OF SYNTHETIC RESINS (OXYGEN INDEX AND GRADE ACCORDING TO UL94 STANDARD)

| TYPE OF SYNTHETIC RESIN | OXYGEN INDEX | UL94 |
|---|---|---|
| POLYACETAL | 15 TO 16 | HB |
| METHACRYLIC RESIN (ACRYLIC RESIN) | 17 TO 18 | HB |
| POLYETHYLENE | 18 TO 19 | HB |
| POLYPROPYLENE | 18 TO 19 | HB |
| POLYESTER | 18 TO 19 | HB |
| POLYSTYRENE | 18 TO 19 | HB |
| POLYAMIDE (NYLON 66) | 24 TO 25 | V-2 |
| POLYCARBONATE | 24 TO 25 | V-2 |
| POLYVINYL CHLORIDE | 28 TO 38 | V-0 |
| POLYPHENYLENE OXIDE | 27 TO 29 | V-1 |
| FLAME RETARDANT EP RUBBER | 24 TO 28 | V-1 |
| CROSSLINKED POLYETHYLENE | 34 TO 36 | V-0 |
| FLAME RETARDANT CHLOROPRENE RUBBER | 30 TO 35 | V-0 |
| POLYVINYLIDENE | 40 TO 44 | V-0 |
| SILICONE RUBBER (RTV) * ROOM TEMPERATURE CURING TYPE | 26 TO 32 | V-0 |
| TETRACHLOROETHYLENE (TEFLON WHEN POLYMERIZED) | 95 | - |

Fig.7

MATERIAL RELATED TO NON-FLAMMABILITY OF LUMIRROR (REGISTERED TRADEMARK)

| CONDITIONS FOR UL94 AND UL94VTM DETERMINATION CRITERIA | V-0 VTM-0 | V-1 VTM-1 | V-2 VTM-2 |
|---|---|---|---|
| A FLAMING TIME (T1 OR T2) AFTER FLAME IS APPLIED TO INDIVIDUAL TEST PIECES | ≤10 SEC | ≤30 SEC | ≤30 SEC |
| A TOTAL (T1+T2 FOR FIVE SAMPLES) OF FLAMING AND GLOWING TIMES FOR A TOTAL OF 10 APPLICATIONS IN WHICH FLAME IS APPLIED TWICE FOR EACH TEST FOR ONE SET INCLUDING FIVE SAMPLES | ≤50 SEC | ≤250 SEC | ≤250 SEC |
| A TOTAL (T2+T3) OF FLAMING AND GLOWING TIMES IN TEST PIECES AFTER FLAME IS REMOVED AT THE SECOND APPLICATION | ≤30 SEC | ≤60 SEC | ≤60 SEC |
| V: FLAMING OR GLOWING TO A CLAMP VTM: FLAMING OR GLOWING TO A MARK LINE (125 mm) | NO | NO | NO |
| A DRIPPING MATERIAL THAT IGNITES A LINE BELOW 300 mm | NO | NO | YES |

UL94V: IN ADDITION TO NO BURNING TO A CLAMP OR MORE, IT IS DETERMINED WHICH CATEGORY IS COMPATIBLE WITH THIS. IF IT IS NOT WITHIN THE ABOVE RANGE, IT IS OUTSIDE SPECIFICATIONS AND DETERMINED TO FAIL.

UL94VTM: IN ADDITION TO NO BURNING TO A MARK LINE (125 mm) OR MORE, IT IS DETERMINED WHICH CATEGORY IS COMPATIBLE WITH THIS. IF IT IS NOT WITHIN THE ABOVE RANGE, IT IS OUTSIDE SPECIFICATIONS AND DETERMINED TO FAIL.

ELECTRONIC DEVICE INCLUDING ELEMENT IN WHICH ELECTRIC CURRENT FLOWS, AND IMAGE FORMING DEVICE INCLUDING THE ELECTRONIC DEVICE

INCORPORATION BY REFERENCE

This application claims priority to Japanese Patent Application No. 2016-145681 filed on 25 Jul. 2016, and No. 2016-211830 filed on 28 Oct. 2016, the entire disclosure of which are incorporated herein by reference.

BACKGROUND

The present disclosure relates to an electronic device including an element in which an electric current flows and an image forming device, and particularly, relates to a technology for handling over heating of an element.

An electronic device includes an element such as a coil, a heater, or a condenser. In order to respond to a case in which an overcurrent flows in the element, for example, a current fuse, a thermal fuse, and a thermistor are incorporated into an electric circuit of the element. Therefore, when the element is overheated, an electric current that flows in the element is blocked or obstructed.

In addition, a non-flammable material is preferably applied to a frame or a housing of such an electronic device. For example, though it is not used for an electronic device, a rubber composition in which both wear resistance and non-flammability are satisfied in high level, and an outer hood for a railway vehicle using such the rubber are suggested.

SUMMARY

According to an aspect of the present disclosure, a technology that further improves the above technology is proposed.

An electronic device according to an aspect of the present disclosure includes an element, a first member, and a second member. An electric current flows in the element. The element is mounted in the first member or the first member is arranged to face the element. In addition, the first member is made of a first resin. The second member is provided adjacent to the first member. In addition, the second member is made of a second resin. In addition, one of the first resin and the second resin has lower non-flammability than the other.

In addition, an image forming device according to another aspect of the present disclosure includes the above electronic device and an image forming unit configured to form an image in a recording medium.

BRIEF DESCRIPTION OF THE DRAWINGS

FIG. 2 is a table showing the definition of three grades of non-flammability based on the JIS oxygen index.

FIG. 3A is a table showing the definition of non-flammability based on the UL94 standard for a horizontal burning test.

FIG. 3B is a table showing the definition of non-flammability based on the UL94 standard for a vertical burning test.

FIG. 4 is a table showing the oxygen index OI for general synthetic resins and evaluation according to the UL94 standard.

FIG. 7 is a table showing materials related to non-flammability of Lumirror (registered trademark).

FIG. 9 is a perspective view showing an image forming device including the above electronic device and the like.

DETAILED DESCRIPTION

Embodiments of the present disclosure will be described below with reference to the drawings.

Figure 1:
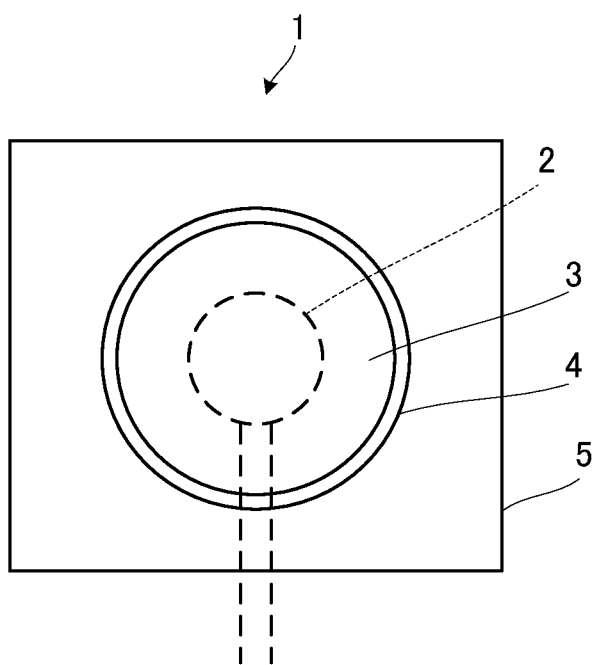
FIG. 1 is a schematic diagram showing a configuration of an electronic device according to a first embodiment of the present disclosure.

FIG. 1 is a schematic diagram showing a configuration of an electronic device according to a first embodiment of the present disclosure. As shown in FIG. 1, an electronic device 1 of the present embodiment is a small speaker configured to output sound. The electronic device 1 includes a voice coil 2, a vibration portion 3 to which the voice coil 2 is attached, a horn unit 4 provided on the outer periphery of the vibration portion 3, and a speaker box 5 supporting the horn unit 4. A magnet or a magnetic material (not shown) that generates a magnetic field is arranged in the vicinity of the voice coil 2. When an audio signal is supplied to the voice coil 2, the voice coil 2 and the vibration portion 3 vibrate to generate sound, and the sound is output from the horn unit 4. Here, the voice coil 2 is an example of the element in the claims.

In the electronic device 1, for example, there is a risk of short-circuiting of the voice coil 2 and an overcurrent flowing in the voice coil 2. Therefore, in the present embodiment, a first resin having high non-flammability is applied to the vibration portion 3 to which the voice coil 2 is attached, and a countermeasure for overheating of the voice coil 2 is adopted, thereby increasing safety. Generally, a fire extinguishing component is mixed into the first resin having high non-flammability in order to enhance non-flammability, a self-extinguishing property, and a flame retardant property. Here, the vibration portion 3 is an example of a first member in the claims.

In addition, a second resin having non-flammability that is appropriately lower than the first resin is applied to the horn unit 4. Further, any material is applied to the speaker box 5 regardless of high non-flammability or low non-flammability. Thus, the degree of freedom in selecting materials of the horn unit 4 and the speaker box 5 is high. Here, the horn unit 4 is an example of a second member in the claims.

In addition, a circular hole is formed in the horn unit 4, the circular vibration portion 3 is fitted into the hole of the horn unit 4, and the horn unit 4 is provided adjacent to the outer periphery of the vibration portion 3.

Specifically, in the present embodiment, when an oxygen index of the first resin forming the vibration portion 3 is set as A and an oxygen index of the second resin forming the horn unit 4 is set as B, the oxygen indexes A and B are set so that the oxygen index A is greater than the oxygen index B and an average value $C(=[(A+B)/2])$ of the oxygen indexes A and B is the preset safety threshold $D(=23)$ or more. This oxygen index is an indicator of non-flammability of a synthetic resin, which will be described below. In addition, one of the oxygen index A and the oxygen index B may be greater than the other, but it is preferable that the oxygen index A be greater than the oxygen index B as described above. For this reason, description will be provided below on the assumption that the oxygen index A is greater than the oxygen index B.

In order to set non-flammability of the first resin to be high as described above, it is necessary to set the oxygen index A of the first resin to be sufficiently great, and preferably, it is necessary to set the oxygen index A to be 27 or more.

In addition, in order to set non-flammability of the second resin to be appropriately lower than that of the first resin as described above, it is necessary to set the oxygen index B of the second resin not to be too small and set the average value C to be the safety threshold D(=23) or more.

Therefore, in the electronic device 1 of the present embodiment, the second resin forming the horn unit 4 is provided adjacent to the first resin forming the vibration portion 3, the type of the first resin and the second resin is appropriately selected, the oxygen index A of the first resin is set to be sufficiently great, the oxygen index B of the second resin is set not to be too small, and the average value C is set to the safety threshold D(=23) or more.

Therefore, in a short-circuiting portion of the voice coil 2, a burning range and a burning time of the vibration portion 3 due to the short-circuiting are minimized.

In addition, while non-flammability of the second resin forming the horn unit 4 is set to be appropriately lower than non-flammability of the first resin, this is set not be too low, and thus the horn unit 4 does not easily burn. Thus, even if burning of the vibration portion 3 spreads to the horn unit 4 adjacent to the vibration portion 3, the fire extinguishing component that is included in the first resin in order to enhance non-flammability, a self-extinguishing property, and a flame retardant property is volatilized according to the burning of the first resin forming the vibration portion 3 and influences burning of the second resin forming the horn unit 4. Therefore, the horn unit 4 is effectively prevented from burning Furthermore, since burning caused by short-circuiting in the voice coil 2 is prevented in the vibration portion 3 and the horn unit 4, the burning does not spread to the speaker box 5 outside the horn unit 4, and the speaker box 5 does not burn.

Here, there are various types of synthetic resins applied as general materials for a frame or a housing of an electronic device. These synthetic resins are classified into a plurality of groups in consideration of non-flammability. Thus, in order to improve safety of the electronic device, it is desirable that a synthetic resin that has been evaluated to have high non-flammability be applied to an important portion.

However, since the electronic device is designed in consideration of not only safety but also mechanical strength, durability, an aesthetic appearance, and costs, if only a synthetic resin having high non-flammability is applied, it is not possible to meet such various demands.

On the other hand, in the present embodiment, since the degree of freedom in selecting materials of the horn unit 4 and the speaker box 5 is high, it is possible to provide the electronic device 1 which is excellent not only in safety but also mechanical strength, durability, an aesthetic appearance, and costs.

Here, the above oxygen index is a Japanese Industrial Standards (JIS) oxygen index OI which is an indicator of non-flammability of a synthetic resin. The JIS oxygen index OI is an indicator representing a percentage of a minimum oxygen concentration necessary for sustaining burning of a synthetic resin. Since the oxygen index OI is 20 in a general air composition, for example, three grades of non-flammability are defined as shown in the table in FIG. 2 based on the vicinity of 20.

As can be clearly understood from the table in FIG. 2, when the oxygen index OI is 22 or less, a synthetic resin burns, when the oxygen index OI is within a numeric range of 22 to 27, a synthetic resin hardly burns, and when the oxygen index OI is 27 or more, a synthetic resin extremely hardly burns. Thus, when the oxygen index OI is 22 or more, safety is thought to be secured.

Therefore, in the present embodiment, the safety threshold D that is compared with the average value C of the oxygen index A of the first resin and the oxygen index B of the second resin is preset to a specified value within a numeric range of 22 to 27 at which a synthetic resin hardly burns. For example, the safety threshold D is set to 23. In addition, the oxygen index A of the first resin is preferably set to 27 or more.

On the other hand, as an indicator for evaluating non-flammability of general synthetic resins, there is the Underwriters Laboratories (UL) 94 standard. A horizontal burning test and a vertical burning test are provided according to the UL94 standard. The horizontal burning test is defined as shown in the table in FIG. 3A. The vertical burning test is defined according to five grades as shown in the table in FIG. 3B.

Here, evaluations of general synthetic resins based on the oxygen index OI and the UL94 standard are shown in the table in FIG. 4.

As can be clearly understood from the table in FIG. 4, as the oxygen index OI increases, non-flammability according to the UL94 standard tends to increase. Based on the table in FIG. 4, for example, when a crosslinked polyethylene (the oxygen index B=34 to 36) is selected as the first resin forming the vibration portion 3, and a methacrylic resin (the oxygen index A=17 to 18) is selected as the second resin forming the horn unit 4, the average value C of the oxygen indexes A and B is 25 to 27. The average value is the safety threshold D(=23) or more and the oxygen index A of the first resin is 27 or more. Thus, as described above, even if the voice coil 2 is overheated due to short-circuiting, the vibration portion 3 hardly burns, and even if burning of the vibration portion 3 spreads to the horn unit 4, the horn unit 4 does not easily burn, the fire extinguishing component in the vibration portion 3 is volatilized according to burning of the vibration portion 3, and influences burning of the horn unit 4, and the horn unit 4 is effectively prevented from burning.

In addition, when the electronic device 1 is designed, if simply the first resin and the second resin are appropriately selected such that the oxygen index A of the first resin forming the vibration portion 3 is greater than the oxygen index B of the second resin forming the horn unit 4, and the average value C of the oxygen index A and the oxygen index B is the safety threshold D or more, it is possible to evaluate and secure safety.

Here, in the above embodiment, since the horn unit 4 is provided adjacent to the outer periphery of the vibration portion 3, the first resin is applied to the vibration portion 3 and the second resin is applied to the horn unit 4. However, in a configuration in which the horn unit 4 is omitted and the vibration portion 3 is attached to a hole of the speaker box 5, the first resin may be applied to the vibration portion 3 and the second resin may be applied to the speaker box 5.

In addition, while the speaker has been exemplified as the electronic device of the present embodiment, the present disclosure can be applied to another type of electronic device. For example, in a motor, the first resin is applied a mover or a stator to which a coil is attached, and the second resin is applied to a housing of the motor.

Alternatively, the first resin is applied to a support member that directly supports a heater, and the second resin is applied to a frame to which the first resin is attached.

Figure 5:
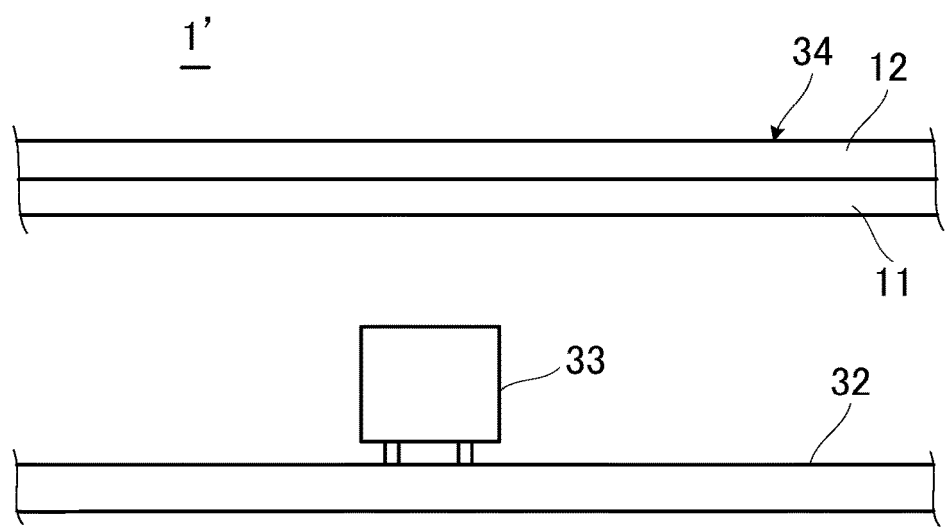
FIG. 5 is a cross-sectional view schematically showing an electronic device according to a second embodiment of the present disclosure.

Next, an electronic device according to a second embodiment of the present disclosure will be described in detail with reference to FIG. 5. FIG. 5 is a cross-sectional view schematically showing the electronic device according to the second embodiment of the present disclosure. Here, the present embodiment is different from the first embodiment as follows. In the first embodiment, the first member made of the first resin is mounted in the element in which an electric current flows. On the other hand, in the present embodiment, a first member is a first resin layer made of a first resin, a second member is a second resin layer made of a second resin, the first resin layer and the second resin layer are laminated as a laminated plate, and the first resin layer as the first member is arranged to face the above element.

As shown in FIG. 5, an electronic device 1' of the present embodiment includes a substrate 32, an electrolytic capacitor 33 installed at the substrate 32, and a cover 34 that is arranged to face and apart from the substrate 32 and is made of a synthetic resin. The cover 34 is arranged to face the electrolytic capacitor 33. In addition to the electrolytic capacitor 33, a plurality of elements (not shown) are mounted in the substrate 32. The electrolytic capacitor 33 and other elements constitute an electronic circuit. Here, the electrolytic capacitor 33 is an example of an element in the claims.

In the electronic device 1', for example, when an overcurrent flows in or an overvoltage is applied to the electrolytic capacitor 33, there is a risk of a combustible material inside the electrolytic capacitor 33 igniting and additionally, there is a concern of fire spreading to the cover 34. Therefore, in the present embodiment, a laminated plate obtained by laminating a first resin layer 11 and a second resin layer 12 is applied as the cover 34, and non-flammability of the cover 34 is enhanced.

Non-flammability of a resin is represented by an oxygen index. The oxygen index A of the first resin layer 11 (that is, the oxygen index A of the first resin) is greater than the oxygen index B of the second resin layer 12 (that is, the oxygen index B of the second resin), and non-flammability of the first resin layer 11 is greater than non-flammability of the second resin layer 12. A fire extinguishing component is mixed into the first resin layer 11 in order to enhance non-flammability, a self-extinguishing property, and a flame retardant property, the oxygen index A increases and non-flammability thereof is enhanced.

In addition, the first resin layer 11 faces the side on the electrolytic capacitor 33, and the first resin layer 11 is interposed between the second resin layer 12 and the electrolytic capacitor 33.

Here, when the electrolytic capacitor 33 ignites, since the first resin layer 11 having high non-flammability faces the side on the electrolytic capacitor 33, the cover 34 hardly burns.

Figure 6:
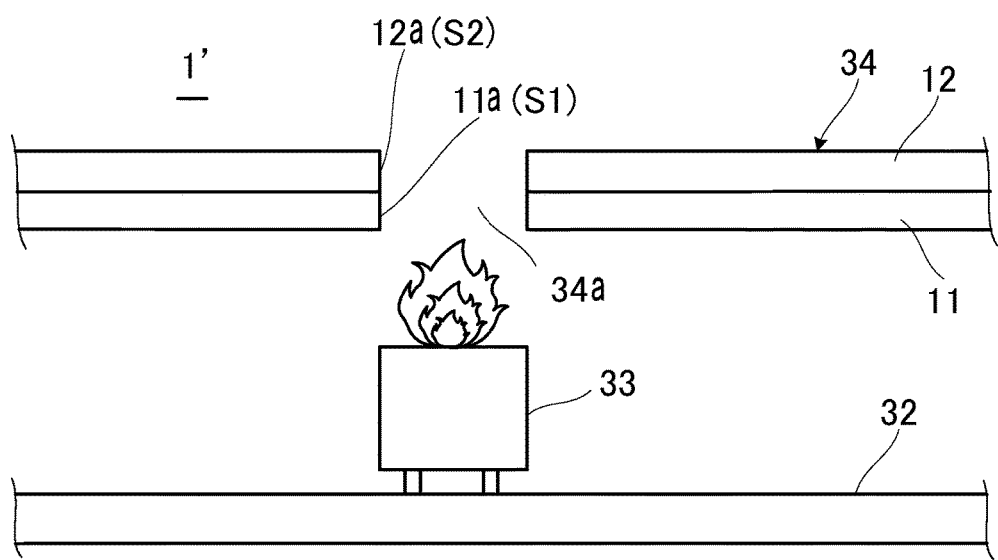
FIG. 6 is a cross-sectional view showing a state in which a hole is formed in a cover of the electronic device in FIG. 5.

However, as shown in FIG. 6, a part of the cover 34 melts due to flame of the electrolytic capacitor 33, and a hole 34a is formed in the cover 34. In this case, since a surface 11a of the first resin layer 11 and a surface 12a of the second resin layer 12 are exposed inside the hole 34a, the surface 12a of the second resin layer 12 having low non-flammability is exposed to flame of the electrolytic capacitor 33.

However, since the surface 11a of the first resin layer 11 is also exposed to flame of the electrolytic capacitor 33, the fire extinguishing component is volatilized from the surface 11a of the first resin layer 11, and the surface 12a of the second resin layer 12 is prevented from burning due to the volatilized fire extinguishing component. For example, it is known that, when a halogen-based flame retardant such as a bromine-based organic compound is added to a resin, halogen radicals in a halogen gas volatilized during burning trap and inactivate active radicals generated during a burning reaction, an oxygen concentration in an atmosphere is reduced due to the halogen gas, and non-flammability is enhanced.

In addition, as the area of the surface 11a of the first resin layer 11 becomes wider, a volatilization amount of the fire extinguishing component in the first resin layer 11 increases. As the area of the surface 12a of the second resin layer 12 becomes narrower, an effect of preventing burning of the surface 12a of the second resin layer 12 due to the fire extinguishing component volatilized from the surface 11a of the first resin layer 11 is enhanced. For this reason, it is desirable to appropriately set the area of the surface 11a of the first resin layer 11 and the area of the surface 12a of the second resin layer 12.

Specifically, in the present embodiment, while the hole 34a is formed in the cover 34 due to flame of the electrolytic capacitor 33, a surface area of the first resin layer 11 exposed inside the hole 34a is set as S1 and a surface area of the second resin layer 12 exposed inside the hole 34a is set as S2.

In addition, an oxygen index of the first resin layer 11 is set as A, an oxygen index of the second resin layer 12 is set as B, and the oxygen index A of the first resin layer 11 is set to be greater than the oxygen index B of the second resin layer 12.

Then, the surface area S1 of the first resin layer 11, the surface area S2 of the second resin layer 12, the oxygen index A of the first resin layer 11, and the oxygen index B of the second resin layer 12 are set so that the value C' derived from the following Equation (1) is the preset safety threshold D'(=23) or more.

$$C' = ((S1 \times A) + (S2 \times B))/2(S1+S2) \qquad (1)$$

Here, when the hole 34a of the cover 34 is assumed to be substantially circular, the diameter of the hole 34a is set as r, the thickness of the first resin layer 11 is set as d1, and the thickness of the second resin layer 12 is set as d2, the surface area S1 of the first resin layer 11 can be approximated from $S1=\pi r \times d1$, and the surface area S2 of the second resin layer 12 can be approximated from $S2=\pi r \times d2$.

Here, in order to set non-flammability of the first resin layer 11 to be high as described above, it is necessary to set the oxygen index A of the first resin layer 11 to be sufficiently great, and preferably, it is necessary to set the oxygen index A to be 27 or more.

In addition, it is necessary to set the oxygen index B of the second resin layer 12 not to be small while non-flammability of the second resin layer 12 is set to be lower than that of the first resin layer 11 as described above.

Furthermore, as the surface area S1 of the first resin layer 11 inside the hole 34a of the cover 34 becomes wider, a volatilization amount of the fire extinguishing component from the surface of the first resin layer 11 increases. As the surface area S2 of the second resin layer 12 inside the hole 34a becomes narrower, an effect of preventing burning of the second resin layer 12 due to the fire extinguishing component volatilized from the surface of the first resin layer 11 is enhanced. Therefore, it is necessary to set the surface area S1 of the first resin layer 11 to be equal to or larger than the surface area S2 of the second resin layer 12 or not to be significantly smaller than the surface area S2 of the second resin layer 12.

For example, when the surface area S1 of the first resin layer 11 and the surface area S2 of the second resin layer 12 are set to be equal to each other, Equation (1) is C'=(A+B)/2, the oxygen index A of the first resin layer 11 is set to 27 or more and the oxygen index B of the second resin layer is set not to be too small so that the value C' is the safety threshold D'(=23) or more. That is, when the surface area S1 and the surface area S2 are set to be equal to each other, the value C' obtained from Equation (1) is the average value of the oxygen index A and the oxygen index B, that is, the average value C in the first embodiment as described above.

Then, when the surface area S1 of the first resin layer 11 is set to be narrower than the surface area S2 of the second resin layer 12, in order to set the value C' to be the safety threshold D'(=23) or more, it is necessary to set either of the oxygen index A of the first resin layer 11 and the oxygen index B of the second resin layer to be greater.

Accordingly, as shown in FIG. 6, even if the hole 34a is formed in the cover 34 due to ignition of the electrolytic capacitor 33, the surface 11a of the first resin layer 11 inside the hole 34a does not burn, and burning of the surface 12a of the second resin layer 12 inside the hole 34a is effectively prevented due to the fire extinguishing component volatilized from the surface of the first resin layer 11, and it is possible to prevent fire spreading of the cover 34 itself.

In addition, since it is not necessary for the second resin layer 12 to emphasize the degree of non-flammability like the first resin layer 11, and the degree of freedom in selecting a material thereof is high, it is possible to provide the cover 34 that is excellent not only in safety but also mechanical strength, durability, an aesthetic appearance, and costs.

Next, the above safety threshold D' will be described. As described above, the above oxygen index is the JIS oxygen index OI which is an indicator of non-flammability of a synthetic resin. The JIS oxygen index OI is an indicator representing a percentage of a minimum oxygen concentration necessary for sustaining burning of a synthetic resin. Since the oxygen index OI is 20 in a general air composition, for example, three grades of non-flammability are defined as shown in the table in FIG. 2 based on the vicinity of 20.

As can be clearly understood from the table in FIG. 2, when the oxygen index OI is 22 or less, a synthetic resin burns, when the oxygen index OI is within a numeric range of 22 to 27, a synthetic resin hardly burns, and when the oxygen index OI is 27 or more, a synthetic resin extremely hardly burns. Thus, when the oxygen index OI is 22 or more, safety is thought to be secured.

Therefore, in the present embodiment, the safety threshold D' that is compared with the value C' derived from Equation (1) is preset to a specified value within a numeric range of 22 to 27 at which a synthetic resin hardly burns. For example, the safety threshold D is set to 23. In addition, the oxygen index A of the first resin layer 11 is preferably set to 27 or more.

Next, specific examples of the first resin layer 11 and the second resin layer 12 will be described. As an indicator for evaluating non-flammability of general synthetic resins, there is the UL94 standard. As described above, a horizontal burning test and a vertical burning test are provided according to the UL94 standard. The horizontal burning test is defined as shown in the table in FIG. 3A. The vertical burning test is defined according to five grades as shown in the table in FIG. 3B.

Here, evaluations of general synthetic resins based on the oxygen index OI and the UL94 standard are shown in the table in FIG. 4 as described above.

As can be clearly understood from the table in FIG. 4, as the oxygen index OI increases, non-flammability according to the UL94 standard tends to increase. Based on the table in FIG. 4, for example, when a crosslinked polyethylene (the oxygen index B=34 to 36) is selected as the first resin layer 11, and a methacrylic resin (the oxygen index A=17 to 18) is selected as the second resin layer 12, and the surface area S1 of the first resin layer 11 and the surface area S2 of the second resin layer 12 are equal to each other, the value C' derived from Equation (1) is 25 to 27, the value C' is the safety threshold D'(=23) or more, and the oxygen index A of the first resin layer 11 is 27 or more. Therefore, as described above, even if the electrolytic capacitor 33 ignites and flame of the electrolytic capacitor 33 is exposed to the surface 11a of the first resin layer 11, the cover 34 hardly burns, and even if the hole 34a is formed in the cover 34, the fire extinguishing component in the first resin layer 11 is volatilized and the second resin layer 12 is prevented from burning due to the volatilized fire extinguishing component.

In addition, when the electronic device 1' is designed, the surface area S1 of the first resin layer 11, the surface area S2 of the second resin layer 12, the oxygen index A of the first resin layer 11, and the oxygen index B of the second resin layer 12 are appropriately set so that the value C' derived from Equation (1) is the safety threshold D' or more. Therefore, it is possible to evaluate and secure safety.

FIG. 7 shows materials related to non-flammability of Lumirror (registered trademark, commercially available from Toray Advanced Film Co., Ltd.) that can be applied for the first resin layer 11.

According to the materials in FIG. 7, Lumirror of a type corresponding to V-0 and VTM-0 has high non-flammability, and can be applied for the first resin layer 11.

Here, while an oxygen index of Lumirror is not described, the oxygen index of Lumirror is measured by a known oxygen index measurement method or measurement device. The measured oxygen index is applied as the oxygen index A of the first resin layer 11 in Equation (1), and other parameters, that is, the surface area S1 of the first resin layer 11, the surface area S2 of the second resin layer 12, and the oxygen index B of the second resin layer 12, may be appropriate set so that the value C' derived from Equation (1) is the safety threshold D' or more.

Figure 8A:
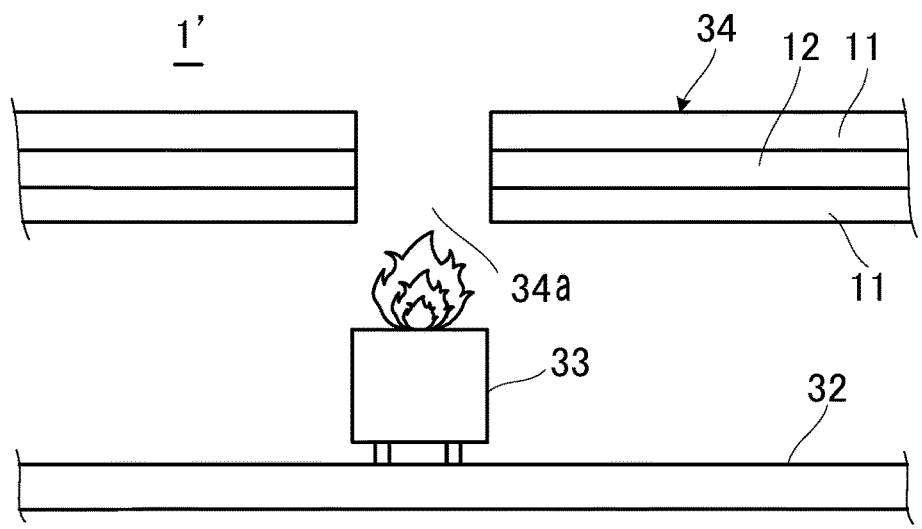
FIG. 8A is a cross-sectional view schematically showing a modified example of the electronic device.

However, most of Lumirror has a thin film form. Therefore, as shown in FIG. 8A, a plurality of first resin layers 11 formed by applying Lumirror may be provided. For example, as shown in FIG. 8A, in the cover 34, the second resin layer 12 is laminated between the two first resin layers 11. In this case, the surface areas S1 and S2, and the oxygen indexes A and B are set so that the sum of surface areas of the first resin layers 11 inside the hole 34a of the cover 34 is the surface area S1 in Equation (1) and the value C' derived from Equation (1) is the safety threshold D' or more. In addition, as described above, since the two first resin layers 11 are provided outside the cover 34, it is possible to easily arrange the first resin layer 11 to face the electrolytic capacitor 33, and it is possible easily manufacture the electronic device 1'.

Figure 8B:
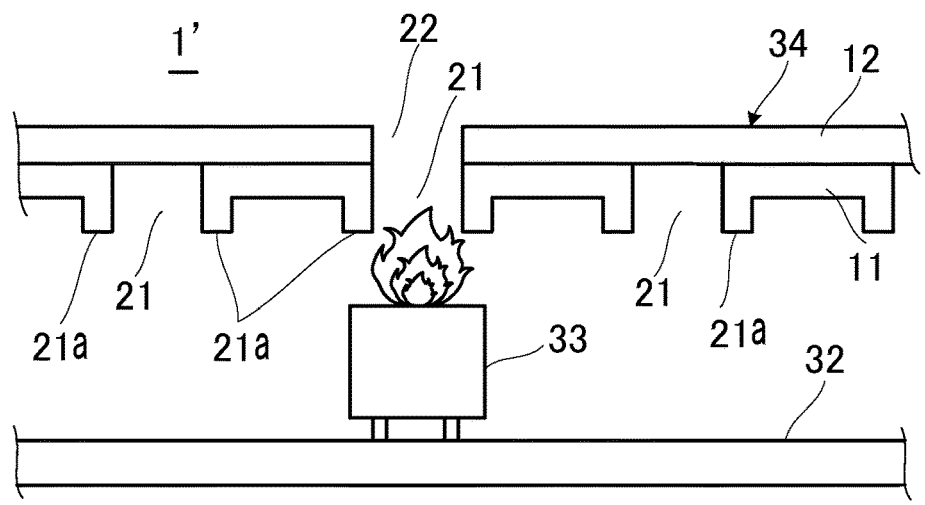
FIG. 8B is a cross-sectional view schematically showing another modified example of the electronic device.

Alternatively, as shown in FIG. 8B, a plurality of holes 21 punched out from the top surface to the bottom surface are formed in the first resin layer 11, and burrs 21a are formed around the holes 21 on the bottom surface. Then, the cover 34 may be formed by bonding the first resin layer 11 to the bottom surface of the second resin layer 12. Since the burr 21a of the hole 21 of the first resin layer 11 is formed downward, the surface area inside the hole 21 of the first resin layer 11 becomes wider. Here, the burr 21a is an example of a protrusion in the claims.

In this case, due to ignition of the electrolytic capacitor 33, a hole 22 is formed in the second resin layer 12 through the hole 21 of the first resin layer 11, and the hole 21 of the first resin layer 11 and the hole 22 of the second resin layer 12 overlap. In this case, since the surface area inside the hole 21 of the first resin layer 11 is the surface area S1 in Equation (1) and the surface area S1 inside the hole 21 is wide, an effect of preventing burning of the second resin layer 12 due to the fire extinguishing component volatilized from the surface of the first resin layer 11 is enhanced Furthermore, the diameter of each of the holes 21 in the first resin layer 11 shown in FIG. 8B may be set to be smaller, and the number of holes 21 may increase. In this case, due to ignition of the electrolytic capacitor 33, the holes 22 are formed in the second resin layer 12 through the holes 21 of the first resin layer 11, and the holes 21 of the first resin layer 11 and the holes 22 of the second resin layer 12 overlap. Therefore, the relationship of Equation (1) is established for each of the holes 21 and the holes 22 that overlap, and fire is prevented from spreading to the cover 34.

Figure 9:
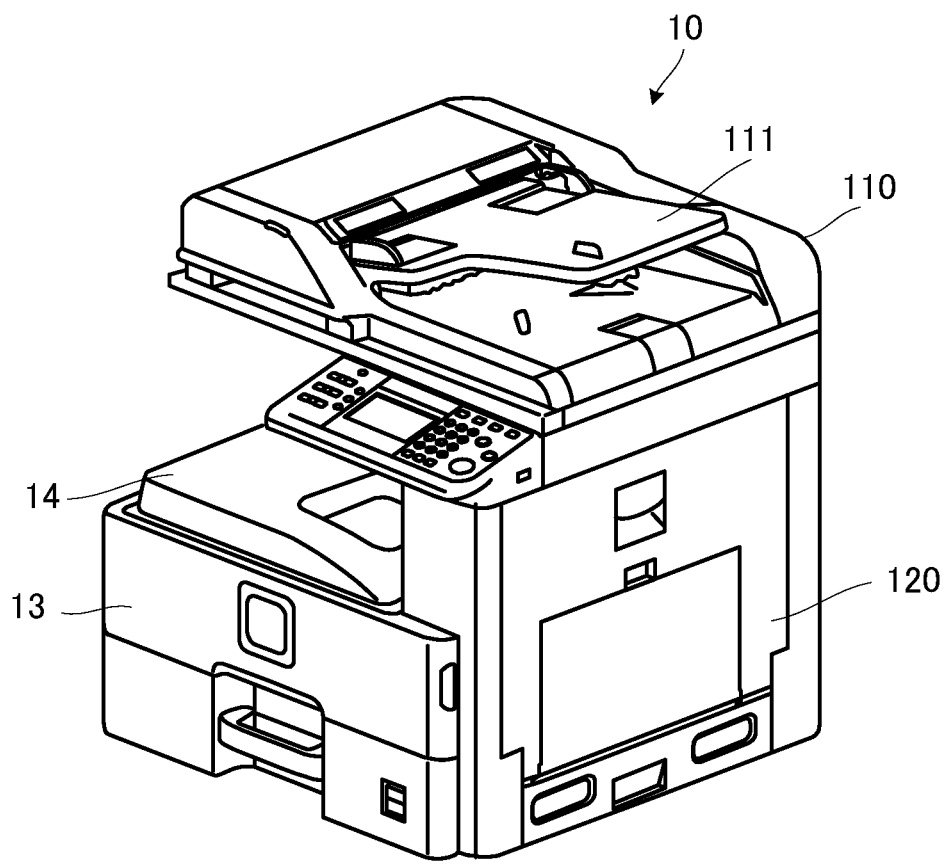

Furthermore, the present disclosure includes an image forming device including the electronic device 1 or the electronic device 1'. FIG. 9 is a perspective view showing an exemplary image forming device. An image forming device 10 shown in FIG. 9 is, for example, a multifunction machine including a plurality of functions such as a copy function, a printer function, a scanner function, and a facsimile function. The image forming device 10 has a schematic configuration that includes an image reading unit 110, an image forming unit 120, a sheet feeding unit 13, and a discharge tray 14.

When the image forming device 10 performs an image reading operation, the image reading unit 110 reads a document placed on a document placement table 111, and generates image data representing an image of the document. The image data is stored in an image memory (not shown).

When the image forming device 10 performs an image forming operation, the image forming unit 120 forms a toner image on a recording sheet fed from the sheet feeding unit 13 based on the image data stored in the image memory. Then, the toner image formed on the recording sheet is thermally fixed by a fixing unit (not shown). The recording sheet on which the image is formed and for which the fixing process is completed is discharged to the discharge tray 14.

In the image forming device 10, in order to produce a sound message or an error sound, the above speaker of the electronic device 1 is applied. In order to drive a plurality of rollers by which a recording sheet is transferred and discharged, the above motor of the electronic device 1 is applied. Furthermore, in order to thermally fix a recording sheet, the above heater of the electronic device 1 can be applied.

In addition, in the image forming device 10, it is possible to apply the configuration of the electronic device 1' as a power supply thereof, and it is possible to obtain the same operational effect as in the electronic device 1'.

In addition, in the above embodiments, the configuration and the process described with reference to FIG. 1 to FIG. 9 are only one embodiment of the present disclosure, and the present disclosure is not limited to the configuration and the process.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
   an element in which an electric current flows;
   a first member in which the element is mounted or which is arranged to face the element and which is made of a first resin; and
   a second member that is provided adjacent to the first member and made of a second resin,
   wherein one of the first resin and the second resin has lower non-flammability than the other,
   the element is mounted in the first member, and
   when an oxygen index of the first resin is set as A and an oxygen index of the second resin is set as B, the oxygen indexes A and B are set so that an average value C of the oxygen indexes A and B is a preset safety threshold D or more.

2. The electronic device according to claim 1, wherein the second resin has lower non-flammability than the first resin, and
   the oxygen index A is greater than the oxygen index B.

3. The electronic device according to claim 1, wherein the safety threshold D is a specified value within a numeric range of 22 to 27.

4. The electronic device according to claim 3, wherein the safety threshold D is 23.

5. The electronic device according to claim 1, wherein the oxygen index A is 27 or more.

6. The electronic device according to claim 1, wherein the element is a voice coil of a speaker,
   the first member is a vibration portion in which the voice coil is provided, and
   the second member is a horn or a speaker box that is provided adjacent to the vibration portion.

7. The electronic device according to claim 1, wherein the element is a coil of a motor.

8. The electronic device according to claim 1, wherein the element is a heater.

9. The electronic device according to claim 1, wherein the first resin is a crosslinked polyethylene, and
   the second resin is a methacrylic resin.

10. An image forming device comprising:
    the electronic device according to claim 1; and
    an image forming unit configured to form an image in a recording medium.

11. An electronic device comprising:
    an element in which an electric current flows;
    a first member in which the element is mounted or which is arranged to face the element and which is made of a first resin; and
    a second member that is provided adjacent to the first member and made of a second resin,
    wherein one of the first resin and the second resin has lower non-flammability than the other,
    the first member is a first resin layer that is arranged to face the element and is made of the first resin,
    the second member is a second resin layer that is made of the second resin, the electronic device further comprises a laminated plate obtained by laminating the first resin layer and the second resin layer, the second resin layer has lower non-flammability than the first resin layer, and when a hole is formed in the laminated plate in a direction penetrating the laminated plate from the element, if a surface area of the first resin layer exposed inside the hole is set as S1, a surface area of the second resin layer exposed inside the hole is set as S2, an oxygen index of the first resin layer is set as A, and an oxygen index of the second resin layer is set as B, the surface areas S1 and S2 and the oxygen indexes A and B are set so that a value C' derived from the following Equation (1) is a preset safety threshold D' or more, $$C'=((S1\times A)+(S2\times B))/2(S1+S2) \qquad (1)$$

12. The electronic device according to claim 11, wherein the oxygen index A is greater than the oxygen index B.

13. The electronic device according to claim 11, wherein the safety threshold D' is a specified value within a numeric range of 22 to 27.

14. The electronic device according to claim 13, wherein the safety threshold D' is 23.

15. The electronic device according to claim 11, wherein the oxygen index A is 27 or more.

16. The electronic device according to claim 11, wherein
the element is a condenser installed on a substrate, and
the laminated plate is a cover that is arranged to face and apart from the substrate.

17. The electronic device according to claim 11, wherein
the first resin is a crosslinked polyethylene, and
the second resin is a methacrylic resin.

18. The electronic device according to claim 11, wherein, in the laminated plate, the second resin layer is laminated between the two first resin layers.

19. The electronic device according to claim 11, wherein a protrusion that protrudes toward the element is provided in the first resin layer.

* * * * *